United States Patent [19]
Long et al.

[11] Patent Number: 5,799,617
[45] Date of Patent: Sep. 1, 1998

[54] ANIMAL HEAD SUPPORT DEVICE AND METHOD OF USE

[75] Inventors: Raymond D. Long; Scott Greene, both of Sparks, Nev.

[73] Assignee: Rena Pimpl, Reno, Nev.

[21] Appl. No.: 768,234

[22] Filed: Dec. 17, 1995

Related U.S. Application Data

[63] Continuation of Ser. No. 534,715, Sep. 27, 1995, abandoned.
[51] Int. Cl.$^6$ .................................................. A01K 15/04
[52] U.S. Cl. .................................................. 119/712
[58] Field of Search .................... 119/712, 729, 119/751, 755, 756, 814, 815, 816, 817

[56] References Cited

U.S. PATENT DOCUMENTS

| | | |
|---|---|---|
| 811,586 | 2/1906 | Samuell . |
| 4,186,690 | 2/1980 | Seiler . |
| 4,470,372 | 9/1984 | Norman . |
| 4,549,501 | 10/1985 | Anderson et al. . |
| 4,942,846 | 7/1990 | Reinhold et al. . |
| 5,329,882 | 7/1994 | Hunt . |

FOREIGN PATENT DOCUMENTS

| | | |
|---|---|---|
| 1316196 | 12/1962 | France . |
| 466060 | 8/1927 | Germany . |

OTHER PUBLICATIONS

Official Gazette, p. 1312, dated Oct. 17, 1882.

*Primary Examiner*—Thomas Price
*Attorney, Agent, or Firm*—Ian F. Burns, Esq.

[57] ABSTRACT

The present invention is substantially an animal head support device and method of use which may be used by veterinarians or other qualified persons to adjustably and comfortably support the head of an anaesthetized animal during medical treatment or other procedures. The device includes a ring for receiving the head of an animal there through, a support means, such as a rope, for supporting the ring from an overhead structure, and a padded chin rest. The device may further include a cam cleat which allows for variable height adjustment. An alternative embodiment is disclosed which provides a ground mounted support device in which a flexible stand supports a U-shaped ring which in turn supports the head of the animal.

13 Claims, 4 Drawing Sheets

ANIMAL HEAD SUPPORT DEVICE AND METHOD OF USE

CROSS REFERENCES TO RELATED APPLICATION

This patent application is a continuation of application Ser. No. 08/534,715 which was filed on Sep. 27, 1995, now abandoned.

BACKGROUND OF THE INVENTION

1. Field of Invention

The present invention relates to head support devices which may be used to support the head of an anaesthetized animal, such as a horse.

2. Description of Related Art

It is a common practice in the field of veterinary medicine to sedate animals when performing some procedures. For example, horses are routinely sedated when dental procedures are performed, such as floating (filing) a horse's teeth. Sedation keeps the animal calm during the procedure, allows the practitioner to more quickly and easily perform the procedure, and prevents injury to the animal and the practitioner. In fact, some procedures would be impossible to perform without sedating the animal.

One of the problems associated with sedating animals is that sedated animals tend to drop their heads towards the ground. This is not only uncomfortable for the animal, but significantly interferes with many veterinary procedures involving the animal's head. It is often necessary for the practitioner to employ an assistant to physically hold the animal's head up. It can be costly for the practitioner to employ an assistant to do this and an assistant is not always available. Therefore, a need exists for a portable device which humanely, safely, and comfortably supports the head of a sedated animal.

In the past, many devices to restrain animals have been developed, such as U.S. Pat. Nos. 5,329,882, 4,549,501 and 266,016. However, each of these devices are intended to immobilize the animal and not intended to support the animal's head. It has been found that many animals, such as horses, become spooked when their heads are restrained and they can injure themselves and the practitioner by trying to escape. Therefore, it is contended that during medical treatment, a sedated animal's head should be supported and not restrained, so as to reduce the risk of injury and alleviate stress which may be experienced by the animal.

SUMMARY OF INVENTION

1. Objects of the Invention

It is therefore an object of the present invention to provide an animal head support device which may be used by veterinarians, or the like, for comfortably supporting the head of an anesthetized animal during medical treatment.

A further object of the present invention is to provide an animal head support device which is portable.

Another object of the present invention is to provide an animal head support device which may be manufactured in a variety of sizes so as to allow the device to be used with various sized animals.

Still another object of the present invention is to provide an animal head support device which allows the user to perform medical procedures upon an animal while remaining in a normal standing position.

Also, another object of the present invention is to provide an animal head support device which allows the user to easily maneuver the animal's head into various positions and directions, such as latterly and longitudinally.

Yet another object of the present invention is to provide an animal head support device which is vertically adjustable.

Still another object of the present invention is to provide an animal head support device which is removably attachable to an overhead support structure, such as a beam, barn rafter, or a support pole as found on a typical cattle stock.

A further object of the present invention is to provide an animal head support device which utilizes a cam cleat to adjust the height of the device.

Yet another important object of the present invention is to provide an animal head support device which includes a cross bar shaped to comfortably support the chin of an animal when positioned thereupon.

Still another object of the present invention is to provide an animal head support device which includes a resilient cushion which also provides padding for the cross bar.

A further object of the present invention is to provide an animal head support device which includes a removable protective cover for protecting the cushion described above.

Another object of the present invention is to provide an animal head support device which is safe and easy to use.

Yet another object of the present invention is to provide an animal head support device which does not restrain the animal but simply provides comfortable head support.

Still another object of the present invention is to provide an animal head support device which may be made from a variety of suitable materials, such as wood, nylon, plastic, hard rubber, and metal.

A further object of the present invention is to provide an animal head support device which is easy and economical to manufacture.

Yet another object of the present invention is to provide an animal head support device which places the animal's head at a position of choice, which allows the user to easily perform numerous medical procedures in an unobstructed manner.

A further object of the present invention is to provide an animal head support device which supports the head of an animal from the ground.

Still another object of the present invention is to provide an animal head support device which supports the head of an animal from the ground and is flexible enough to allow the animal to move its head laterally and longitudinally.

A further object of the present invention is to provide a ground standing head support device which does not completely enclose the animal's head.

Still another object of the present invention is to provide a method of use for an animal head support device.

Other objects and advantages will be seen within the following specification and claims.

2. Brief Description of the Invention

The present invention is substantially an animal head support device used by veterinarians or the like, for supporting the head of an anesthetized animal during medical treatment. The device substantially includes a ring being of a size and shape to freely receive the head of an animal there through. Support means, such as a rope, which may be attached to the ring for supporting the ring. A cushioned chin rest is also provided for supporting the chin of the animal. The support means may be removably attached to an overhead support structure, such as a beam, or if preferred, the rope may be draped over the support structure and adjust-

REFERENCE NUMERALS

Figure 1:
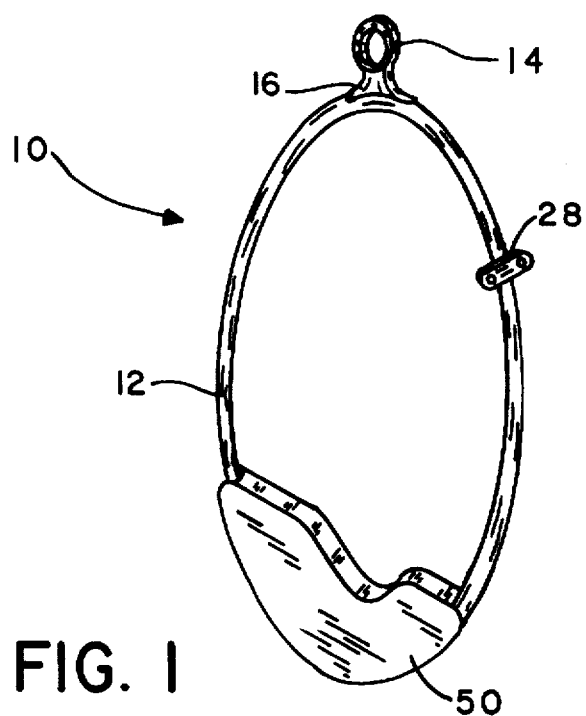
FIG. 1 is substantially a perspective view of the present invention.
Figure 2:
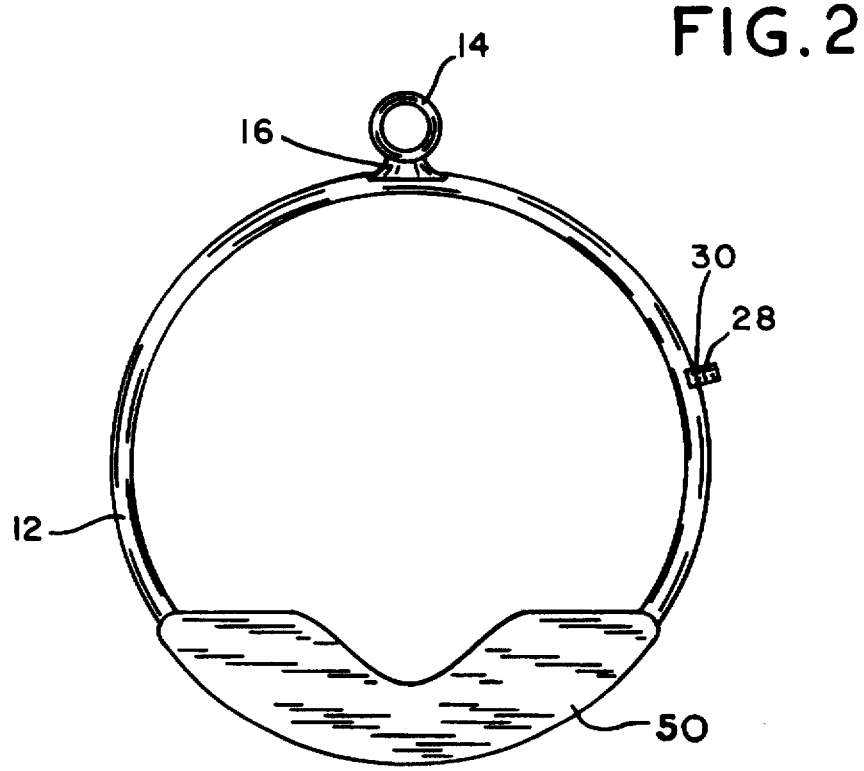
FIG. 2 is substantially a frontal view of the present invention.
Figure 3:
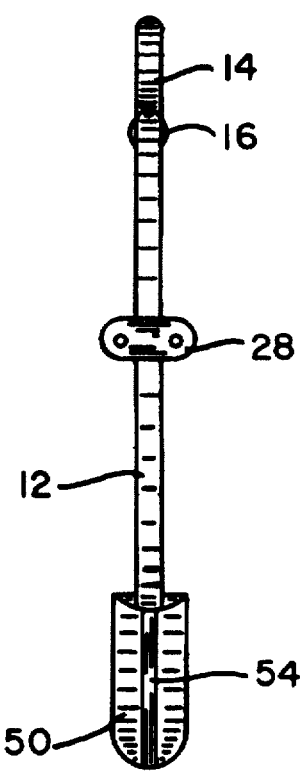
FIG. 3 is substantially a right side view of the present invention.
Figure 4:
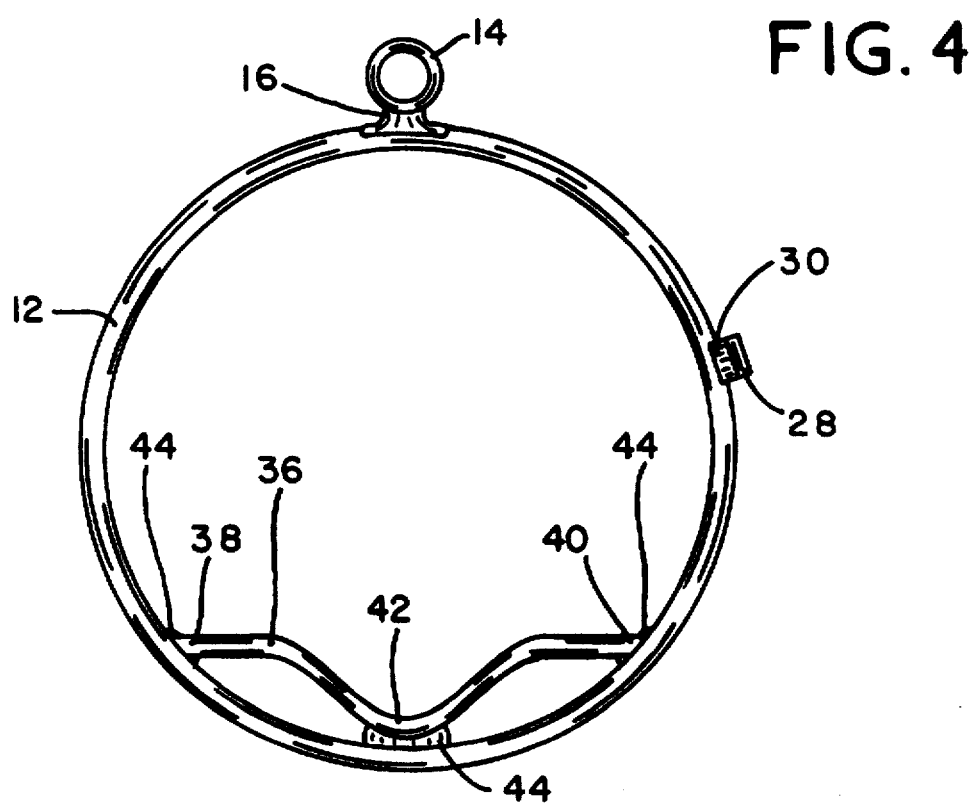
FIG. 4 is substantially a frontal view of the present invention without a cushion of the present invention.

| | |
|---|---|
| 10 | head support device |
| 12 | first ring |
| 14 | second ring |
| 16 | weld |
| 18 | rope |
| 20 | first end |
| 22 | second end |
| 24 | integral connection portion |
| 26 | knot |
| 27 | beam |
| 28 | bracket |
| 29 | beam |
| 30 | welding |
| 32 | cam cleat |
| 34 | screw holes |
| 36 | cross bar |
| 38 | first end |
| 40 | second end |
| 42 | central section |
| 44 | welding |
| 46 | cushion |
| 48 | recess |
| 50 | protective cover |
| 52 | tab |
| 54 | overlying flap |
| 56 | overlying flap |
| 60 | ground mounted head support device |
| 62 | ring |
| 63 | ball |
| 64 | cushion |
| 65 | cross bar |
| 66 | bracket at cover |
| 67 | cover |
| 68 | bracket |
| 70 | adjustable support shaft |
| 72 | support sleeve |
| 74 | holes |
| 76 | locking pin |
| 78 | flexible support means |
| 79 | spring |
| 80 | shaft |

-continued

REFERENCE NUMERALS

| | |
|---|---|
| 82 | sleeve |
| 84 | support legs |
| 86 | stand |

DESCRIPTION OF THE PREFERRED EMBODIMENT

Referring now in detail to the drawings wherein like characters refer to like elements throughout the various views.

As shown in FIG. 1-4, and 11, an animal head support device 10 comprises ring 12, being of a size and shape to freely receive the head of an animal there through and is provided for supporting an animal's head. The ring 12 may be made from any suitable material of choice, such as nylon, plastics, rubber, wood, and metal, which is strong enough to support the weight of sedated animal's head. A second ring 14, being of a size and shape to removably receive a support means (later described) there through, is attached to ring 12. Ring 14 may be made from any suitable material of choice, such as those mentioned above. Second ring 14 is attached to ring 12 (at a location of engineering choice) by any suitable attachment means of choice, such as by weld 16. In an alternative embodiment, ring 14 may not be provided and the support means may be attached directly to ring 12.

Figure 11:
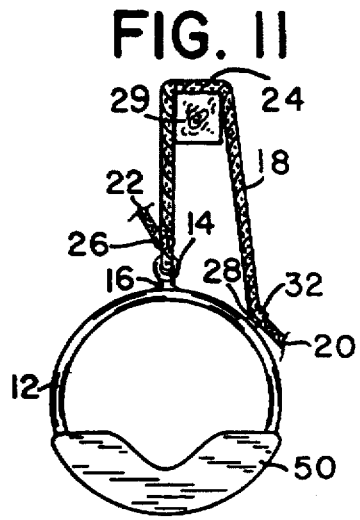
FIG. 11 is substantially a plan view of the present invention supported by an overhead beam.

Ring 14 may be supported by any suitable support means of choice, such as a rope 18 or a chain (not shown), which has a first end 20, a second end 22, and substantially an integral connecting portion 24, as shown in FIG. 11. Ring 14 is a size and shape to removably and slidably receive second end 22 of rope 18 there through and may be attached by a knot 26 or any other suitable attachment method. Rope 18 may be attached to any suitable support structure of choice, such as a support pole as found on a typical cattle stock, a stable or barn rafter, or as herein shown, a beam 29.

Figure 9:
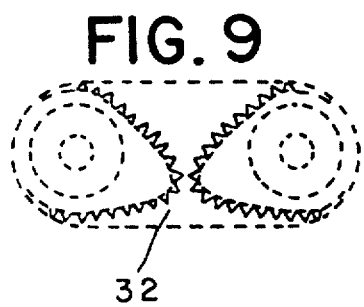
FIG. 9 is substantially a cam cleat shown in ghost lines.
Figure 10:
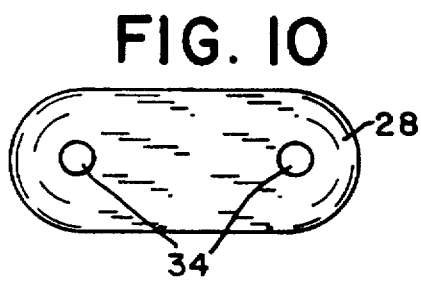
FIG. 10 is substantially a frontal view of a bracket.

The first ring 12 may further include vertical adjustment means, such as a bracket 28 which is fixedly attached to the first ring 12 (at a location of engineering choice) by weld 30 or other attachment means of choice. Bracket 28 being of a size and shape to removably attach any suitable rope lock means of choice, such as cam cleat 32 which is manufactured by Ronstan 2000 Pty., Ltd., of Australia, shown in FIG. 9. The cam cleat 32 may be removably attached to the bracket 28 by a suitable attachment means of choice, such as by screws (not shown) through screw holes 34, as shown in FIG. 10. Furthermore, cam cleat 32 is a shape and size capable of removably and adjustably receiving the first end 20 of rope 18.

Figure 5:
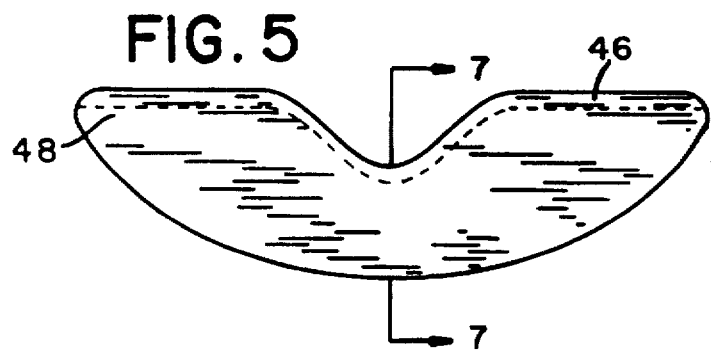
FIG. 5 is substantially a frontal view of a resilient cushion of the present invention.
Figure 7:
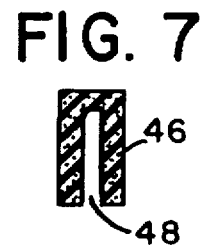
FIG. 7 is substantially a sectional view of the cushion taken at line 7—7 of FIG. 5.
Figure 6:
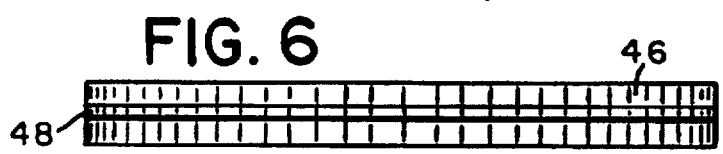
FIG. 6 is substantially a bottom view of the cushion shown in FIG. 5.

The device 10 further includes a cushioned chin rest which may be of any suitable shape or size of engineering choice. The chin rest comprises a cross bar 36 (shown in FIG. 4) which has substantially a first end 38, a second end 40, and a central section 42. First and second ends 38 and 40 (and the central section 42 if so desired) are fixedly attached to ring 12 by a suitable attachment means, such as by weld 44. Central section 42 may be of a shape and size to comfortably support the chin of an animal when positioned thereupon. Central section 42 may be contoured to fit the head of the animal with which it is intended to be used. Further included is a cushion 46 which may be formed into any suitable shape or size to functionally support the chin of an animal, as shown in FIGS. 5, 6, and 7. Cushion 46 may be made from any suitable material of choice, such as foam rubber. Cushion 46 further includes removable attachment means of choice such as recess 48 for removably attaching and receiving the cross bar 36 therein.

Figure 8:
FIG. 8 is substantially a bottom view of a protective cushion cover of the present invention.

A protective cover 50 may be used to protect cushion 46. Cover 50 may be made of any suitable material of choice, such as plastic, nylon, or cloth, and cover 50 may be of a shape and size to contain cushion 46 therein. Protective cover 50 may also be removably attached to cushion 46, if so desired, by any suitable attachment and/or closure means of choice. As seen in FIG. 8, a VELCRO tab 52 may be provided which releasibly connects two overlying flaps 54 and 56.

The present invention comprises a method for using the animal head support device described above. The following is a summary of the steps which comprise the method of the present invention in reference to FIG. 11 and the above description.

a) attaching second end 22 of rope 18 to second ring 14 by tying a knot 26;

b) positioning the integral connecting portion 24 over the support structure 29;

c) positioning the first end 20 of rope 18 within the cam cleat 32;

d) pulling the first end 20 of rope 18 through the cam cleat 32 until the first ring 12 attains a desired height, determined by the user;

e) inserting an animal's head into ring 12; and f) readjusting the height of support device, if necessary, to support the head of the animal.

It will now be seen that an animal head support device is provided which may be used by veterinarians, or the like, for comfortably supporting the head of an anesthetized animal during medical treatment or other procedures. The animal head support device is portable, vertically adjustable and removably attachable to an overhead support structure. The support device includes a cross bar, a removable cushion, and a cover for protecting the cushion. It will further be seen that the animal head support device is easy to manufacture, safe, and easy to use.

Figure 12:
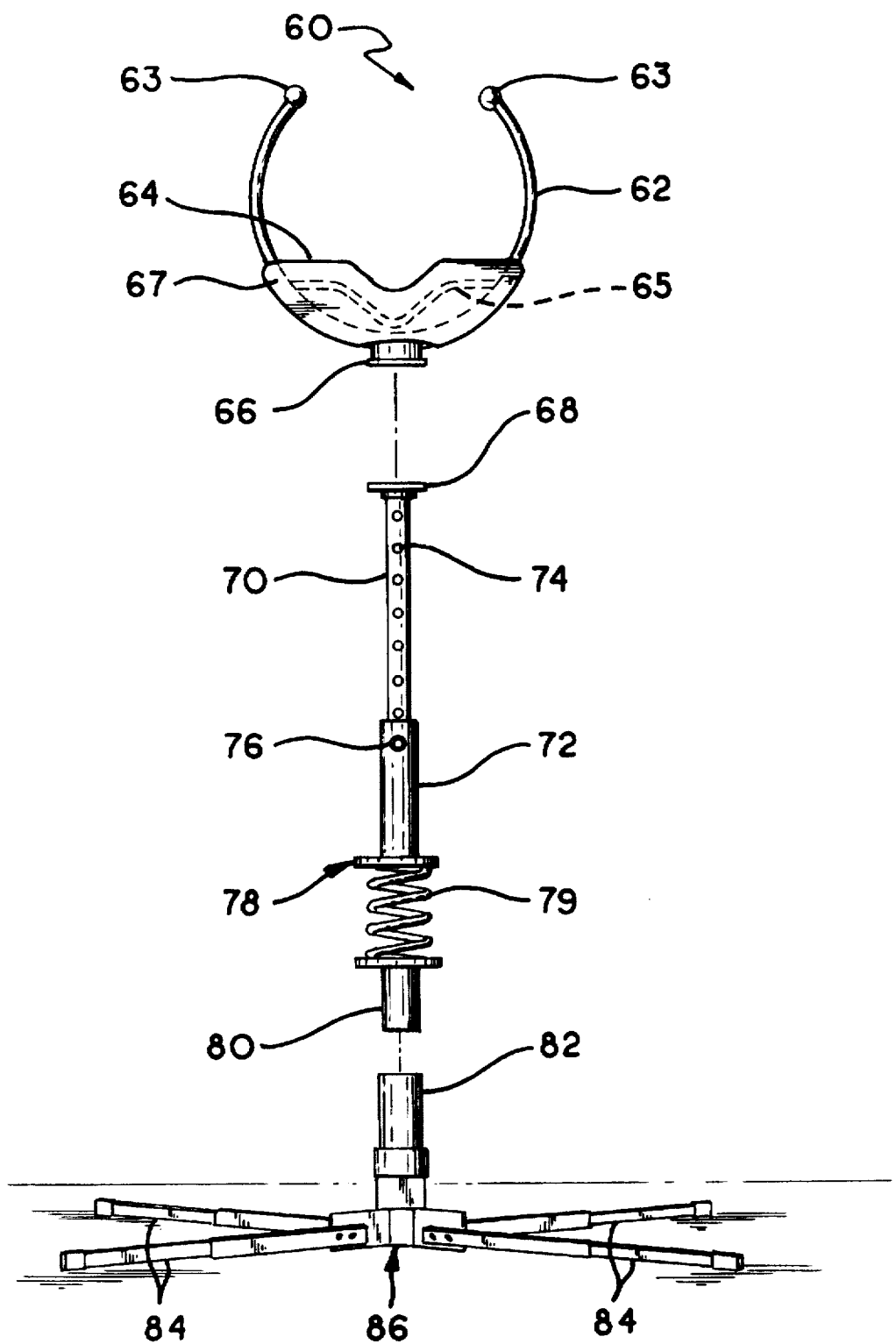
FIG. 12 is substantially an exploded view of a ground supported embodiment of the present invention.

As seen in FIG. 12, the present invention includes an alternative embodiment in which the sedated animal's head is supported from the ground. This ground mounted head support device 60 includes U-shaped ring 62 for receiving the sedated animal's head. In the preferred embodiment, ring 62 has an open portion at the top of the ring. It has been found that some animals, particularly horses, do not like to have their head surrounded by an object. By providing an open portion at the top of ring 62, horses will experience less anxiety and not become spooked during a procedure. Balls 63 may be provided at the upper end of ring 62 to prevent any injury to a sedated animal from sharp edges. Ring 62 may have a cushion 64 for cushioning the sedated animal's head and a cover 67 for protecting cushion 64. Cushion 64 may have substantially the same features and construction as cushion 46 of head support device 10, discussed above. Ring 62 may also include a cross bar 65 for supporting cushion 64. An attachment means or bracket 66 may be attached to ring 62 for allowing an adjustable support shaft 70 to be attached to ring 62. Support shaft 70 may also include bracket 68 for interfacing with bracket 66.

Support shaft 70 comprises a plurality of holes 74 for receiving locking means or locking pin 76. Support shaft 70 is slidably received in support sleeve 72 and may be locked into a variety of heights by locking pin 76. Spring means 78 is attached to support sleeve 72 for flexibly supporting the elements discussed above. Flexible support 78 may include spring 79 or other flexible devices which would allow the entire support device to be flexed laterally and longitudinally relative to the body of the horse. Flexible support 78 is well known in the art of signs.

It has been found that a flexible support device is highly desirable in many animal treatments. Such devices allow the animal to move its head to some degree without knocking over the head support device. Flexible support means 78 is attached to stand 78 though shaft 80 and sleeve 82. Shaft 80 may be inserted into sleeve 82 and the two may be securely bolted together. Support legs 84 are provided on stand 86 for supporting the entire apparatus from the ground. It is recognized that a variety of support stands may be used to achieve the objectives of the present invention.

It will now be seen that an animal head support device is provided which may be used by veterinarians or the like for comfortably supporting the head of an anesthetized animal during medical treatment or other procedures from the ground. The animal head support device may be placed on the ground to adjustably and flexibly support the head of the anesthetized animal. The support device includes a U-shaped ring for receiving and supporting the head of the animal, an adjustable support shaft, and a flexible support means for flexibly supporting the support shaft and ring. A stand is provided for supporting the apparatus from the ground.

Although the invention has been shown and described in what is conceived to be the most practical and preferred embodiment, it is recognized that departures may be made therefrom within the scope and spirit of the invention and that the invention is not limited to the details disclosed herein but is to be accorded the full scope of the claims so as to embrace any and all equivalent devices and apparatus.

What is claimed is:

1. A ground-mounted animal head support device comprising:

(A) a head support for receiving and supporting an animal's head, said head support being of a size and shape to freely receive the animal's head, (B) a support shaft attached to said head support for supporting said head support, and (C) a base removably attachable to said support shaft for supporting said support shaft and said head support from the ground, said base having a sleeve for receiving said shaft and having a plurality of outwardly extending legs for supporting said base from the ground, (D) wherein a sedated animal's head may be supported from the ground and vertically positioned to perform veterinary procedures.

2. The animal head support device of claim 1 wherein said head support is a substantially a U-shaped loop, wherein the animal's head is not enclosed within said head support.

3. The animal head support device of claim 1 wherein said head support comprises a cushion attached to said head support for cushioning the animal's head.

4. The animal head support device of claim 1 wherein said support shaft comprises a support sleeve for slidably receiving said support shaft and locking means for locking said support shaft in said support sleeve, wherein the vertical height of said head support may be adjusted by sliding said support shaft in said support sleeve.

5. The animal head support device of claim 1 wherein said support shaft comprises flexible support means for flexibly supporting said support shaft, wherein vertical height of said head support may be adjusted by sliding said support shaft in said support sleeve.

6. An animal head support device for supporting the head of a sedated animal from the ground while the animal is standing on the ground without restraining the animal's head, the head support device comprising:

(A) a head support for supporting the animal's head, the head support having a substantially open top wherein the animal is able to freely lift its head off of said head support and the animal's head is not restrained within said head support;

(B) a support shaft attached to said head support for supporting said head support; and (C) a base attached to said support shaft for supporting said support shaft from the ground.

7. Wherein the animal stands on the ground and substantially supports its own body and rests its head in the head support device.

8. The animal head support device of claim 6 wherein said head support is a substantially a U-shaped loop, wherein the animal's head is not enclosed within said head support.

9. The animal head support device of claim 6 wherein said head support comprises a cushion attached to said head support for cushioning the animal's head.

10. The animal head support device of claim 6 wherein said support shaft comprises a support sleeve for slideably receiving said support shaft and locking means for locking said support shaft in said support sleeve, wherein vertical height of said head support may be adjusted by sliding said support shaft in said support sleeve.

11. The animal head support device of claim 6 wherein said support shaft comprises flexible support means for flexibly supporting said support shaft.

12. A method of supporting an animals head from ground, the method comprising the following steps:

(A) sedating an animal;

(B) allowing the animal to stand on the ground and substantially support its own body; and (C) supporting the animal's head with a ground mounted head support device to position the animal's head in a vertical position.

13. The method of claim 12 further comprising the step of flexibly supporting the support device wherein the animal's head may move longitudinally and laterally.

* * * * *